(12) United States Patent
Simpson et al.

(10) Patent No.: US 7,027,568 B1
(45) Date of Patent: Apr. 11, 2006

(54) PERSONAL MESSAGE SERVICE WITH ENHANCED TEXT TO SPEECH SYNTHESIS

(75) Inventors: David Simpson, Chatham, NJ (US); James E. Curry, Herndon, VA (US); Alexander I. McAllister, Silver Spring, MD (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 08/948,328

(22) Filed: Oct. 10, 1997

(51) Int. Cl.
*H04M 1/64* (2006.01)

(52) U.S. Cl. ............... 379/88.16; 379/67.1; 379/88.07; 379/88.08; 379/88.12; 379/88.13; 379/88.17; 379/88.18

(58) Field of Classification Search ............... 379/67.1, 379/88.13, 88.17, 93.24, 93.25, 100.07, 900, 379/101.01, 88.07, 88.08, 88.12, 88.16, 88.18; 704/270, 275

See application file for complete search history.

(56) References Cited

U.S. PATENT DOCUMENTS

| | | | | |
|---|---|---|---|---|
| 4,479,124 A | 10/1984 | Rodriguez et al. | ..... | 340/825.44 |
| 4,554,418 A | 11/1985 | Toy | ..... | 379/88.01 |
| 4,627,093 A | 12/1986 | Hashimoto et al. | ......... | 704/258 |
| 4,769,642 A | 9/1988 | Davis et al. | ........... | 340/825.44 |
| 4,812,843 A | 3/1989 | Champion, III et al. | .... | 701/117 |
| 4,821,021 A | 4/1989 | Ide et al. | ................. | 340/311.1 |
| 4,885,577 A | 12/1989 | Nelson | ................... | 340/825.44 |
| 4,942,616 A | 7/1990 | Linstroth et al. | ........... | 704/275 |
| 4,996,707 A | 2/1991 | O'Malley et al. | ...... | 379/100.13 |
| 5,144,648 A | 9/1992 | Bhagat et al. | .............. | 455/31.2 |

(Continued)

OTHER PUBLICATIONS

From Text to Speech with SRS, J. Acoust. Soc. Am., vol. 72, Mar. 16, 1982.*

(Continued)

*Primary Examiner*—Allan Hoosain
(74) *Attorney, Agent, or Firm*—Leonard C. Suchyta, Esq.; Joel Wall, Esq.; Rader Fishman & Grauer PLLC

(57) ABSTRACT

A server in a network gathers textual information, such as news items, E-mail and the like. From that information, the server develops or identifies messages for use by individual subscribers. The same server that accumulates the text messages or another server in the network converts the textual information in each message to a sequence of speech synthesizer instructions. The converted messages, containing the sequences of speech synthesizer instructions, are transmitted to each identified subscriber's terminal device. A synthesizer in the terminal generates an audio waveform signal, representing the speech information, in response to the instructions. In the preferred embodiment, the terminals utilize concatenative type speech synthesizers, each of which has an associated vocabulary of stored fundamental sound samples. The instructions identify the sound samples, in order. The instructions also provide parameters for controlling characteristics of the signal generated during waveform synthesis for each sound sample in each sequence. For example, the instructions may specify the pitch, duration, amplitude, attack envelope and decay envelope for each sample. The division of the text to speech synthesis processing between the server and the terminals places the cost of the front end processing in the server, which is a shared resource. As a result, the hardware and software of the terminal may be relatively simple and inexpensive. Also, it is possible to upgrade the quality of the synthesis by upgrading the server software, without modifying the terminals.

27 Claims, 5 Drawing Sheets

U.S. PATENT DOCUMENTS

| | | | |
|---|---|---|---|
| 5,189,632 A | | 2/1993 | Paajanen et al. ............. 708/109 |
| 5,283,638 A | * | 2/1994 | Engberg et al. ................ 348/14 |
| 5,327,486 A | * | 7/1994 | Wolff et al. .................... 379/96 |
| 5,398,021 A | | 3/1995 | Moore .................. 340/825.27 |
| 5,444,768 A | | 8/1995 | Lemaire et al. ............... 379/68 |
| 5,455,579 A | | 10/1995 | Bennett et al. ............. 341/110 |
| 5,463,713 A | | 10/1995 | Hasegawa ................... 704/260 |
| 5,530,852 A | * | 6/1996 | Meske, Jr. et al. .......... 395/600 |
| 5,568,540 A | * | 10/1996 | Greco et al. ................... 379/89 |
| 5,572,643 A | * | 11/1996 | Judson ........................ 395/793 |
| 5,594,779 A | | 1/1997 | Goodman ................... 455/4.2 |
| 5,600,703 A | | 2/1997 | Dang et al. ................ 455/31.3 |
| 5,608,786 A | * | 3/1997 | Gordon ....................... 379/100 |
| 5,610,821 A | * | 3/1997 | Gazis et al. ............. 364/444.2 |
| 5,768,513 A | * | 6/1998 | Kuthyar et al. ......... 395/200.34 |
| 5,774,859 A | * | 6/1998 | Houser et al. ............... 704/275 |
| 5,835,087 A | * | 11/1998 | Herz et al. .................. 345/810 |
| 5,848,397 A | * | 12/1998 | Marsh et al. .................. 705/14 |
| 5,889,860 A | * | 3/1999 | Eller et al. ...................... 380/4 |
| 5,915,237 A | * | 6/1999 | Boss et al. ................... 704/258 |
| 5,918,013 A | * | 6/1999 | Mighdoll et al. ...... 395/200.47 |
| 5,924,068 A | * | 7/1999 | Richard et al. ............. 704/260 |
| 5,928,330 A | * | 7/1999 | Goetz et al. ................ 709/231 |
| 5,943,648 A | * | 8/1999 | Tel ............................... 704/260 |
| 5,945,989 A | * | 8/1999 | Freishtat et al. ............ 345/329 |
| 5,983,190 A | * | 11/1999 | Trower, II et al. .......... 704/276 |
| 6,035,273 A | * | 3/2000 | Spies .......................... 704/270 |
| 6,115,384 A | * | 9/2000 | Parzych ....................... 370/401 |

OTHER PUBLICATIONS

"Survey of the State of the Art in Human Language Technology: Chapter 5: Spoken Output Technologies", Aug. 12, 1997, http://www.cse.ogi.edu/CSLU/HLTsurvey.

* cited by examiner

PERSONAL MESSAGE SERVICE WITH ENHANCED TEXT TO SPEECH SYNTHESIS

TECHNICAL FIELD

The present invention relates to communication systems and terminal devices for providing personalized information delivery services. In particular, the present invention relates to such a service utilizing one or more network servers to perform personalized information selection and partial conversion of text information to a speech instruction set, various forms of communication to and from a subscriber's terminal, and storage and conversion circuitry in the terminal to provide audible outputs of the information on demand in the form of synthesized human speech.

BACKGROUND ART

Our modern society demands that individuals constantly absorb large amounts of varied information, and there are so many information sources today that many people have to manage the information they receive so as to avoid information overload. Also, in our increasingly mobile society, there is a need to receive the information in a convenient manner while the user is at home, at the office or on the go and even at times when the user's hands and eyes are otherwise occupied. A number of systems have been proposed to provide subscribers with up to date information culled from many sources, in accord with criteria selected by the subscribers based on their individual interests.

For example, U.S. Pat. No. 4,554,418 to Toy discloses a system that continuously monitors a stream of input data, such as financial or stock information. The subscriber submits a list of specific information, such as names of securities of interest. When the list of specific information and monitored data correspond to preselected criteria, for example when the system recognizes that the input data stream includes the selected named securities, a subscriber-specified contact process occurs. Such a specified process may be updating a historical file maintained on the selected subject matter, notification by telephone or computer, or performance of predetermined functional calculations. While this type of system does provide customers with desired information, the ability to receive the information is limited to some type of hardwired (fixed) access, by the need to call in from a normal telephone or communicate via a computer.

U.S. Pat. No. 4,812,843 to Champion, III et al. describes a communication system capable of continuously updating information on a variety of subscriber selected subjects. Primarily, the patent deals with updated traffic information, although the text suggests application to other types of information, including the news. A subscriber inputs DTMF tone codes to select particular information of interest, such as a desired route. The communications system provides the subscriber with updated information reports from information gathered in a database. The system supplies the updated information to the subscriber, in one embodiment by playing pre-recorded voice messages for reception via mobile or landline telephone. The patent discloses alternate embodiments which send data for display on a computer system or a pager.

Similarly, U.S. Pat. No. 5,398,021 to Moore teaches transmission of sports, stock, weather and other news-like data through a paging system. A subscriber database stores records identifying the communication services subscribed to by the party associated with each paging receiver.

Prior systems, such as those suggested to by Champion and Moore, do provide services to send information on subscriber selected topics and some mobility, but the information is transmitted and presented in text form on a computer or a pager display. This is quite adequate in some applications, for example when the subscriber is sitting at a terminal at home or in the office or the subscriber is waiting in a lounge at a transportation terminal. However, there are many situations where the subscriber would like to receive the information but can not use her hands to activate the terminal or look at the terminal for an extended period to read a display. For example, while driving a car a subscriber can not read long news messages presented on a pager display. However, if presented in a convenient form, the subscriber may still want to receive the information at such times.

Devices also have been developed to present users information in audible form. In many situations, a user can listen to the audible presentation while engaged in other activities.

For example, U.S. Pat. No. 5,444,768 to Lemaire et al. discloses a portable computer device for audio reproduction of messages. The device includes a telephone line interface, such as a modem, for receiving digitized messages from a central facility. The central facility downloads textual data messages through the telephone network and the interface, for storage in random access memory. A microprocessor executes text-to-speech conversion rules to provide amplitude and pitch information to excite a digital filter within a speech processor, to create synthetic speech output from the textual data messages. The Lemaire et al. device includes a limited number of tape recorder like switches to activate start/stop, scan and rewind functions for message playback. Portability of the device is limited by the need for a physical connection to the telephone line.

As illustrated by the Lemaire et al. patent, text transmission and text to speech converters are known. However, to produce a high quality synthetic speech output, the text to speech conversion requires a complex speech synthesizer. For example, a company called AccuVoice has developed a 1.5 Mbyte vocabulary of recorded human speech samples, for a text to speech converter. The vocabulary includes all of the phonemes, diphones and triphones of human speech as well as all possible permutations thereof for different inflections and the like. A computer using the AccuVoice vocabulary controls a digital signal processor to play back stored copies of the phonemes, diphones and triphones in a volume and order controlled by a text to speech conversion algorithm. The program for converting text to speech, using the stored vocabulary of phonemes, diphones and triphones, requires additional memory. Although this approach provides adequate speech for computer applications, the memory requirements for the program and the vocabulary are too large for incorporation in a small portable terminal device. As such, systems like that disclosed by Lemaire et al. or the AccuVoice system are not readily adaptable to personal communication services, which sometimes require communications to small portable terminal devices.

U.S. Pat. No. 5,594,779 to Goodman discloses a mobile audio on demand system. Users transmit program selections to a service provider, and the service provider transmits selected audio program information to the users' mobile terminals. The system utilizes cellular telephone communications to transmit the selected audio information in digitized, compressed form. In one implementation, the terminal device may receive the audio data via a high data rate channel and store the compressed information in memory. The compressed audio data may then be retrieved and decoded by a decoder/encoder, and presented to the user at a selected time. The Goodman system does enable some mobility, but there is no provision for receiving and processing text messages. Also, the network transmits digitized speech messages, which requires large amounts of storage in the terminal and may require a relatively large bandwidth if there is a desire to send the messages in real time or at rates faster than real time.

As shown by the above discussion of the prior art, a need still exists for systems and processing techniques for obtaining subscriber desired information and efficiently supplying that information to the subscriber's terminal, in a format facilitating audio presentation thereof to the subscriber.

More specifically, a need exists for a system that will cull selected textual information from a variety of sources and convert that text information to a format that is easily transmitted and stored in a variety of terminal devices, some of which may be small and portable. The terminal devices should provide a high quality speech type audible output of the information. The bandwidth and memory requirements must be kept low to make the service economical and to minimize the cost of the portable terminal. For similar reasons, the processing that the terminal must perform on the received information to produce the speech output also should be minimized, thereby eliminating the need for complex and expensive text to speech conversion equipment and/or software in the typical end user's terminal.

DISCLOSURE OF THE INVENTION

The present invention addresses the above noted needs and provides advances over the existing technology by logically dividing the functionalies involved in text to speech conversion between a server in a network and the subscribers terminals. The equipment and software of the server is shared by many subscribers, thus distributing the cost. The hardware and software of the terminal, however, becomes relatively simple and inexpensive.

The server performs most of the complex text to speech algorithm and then generates instructions for a synthesized speech generator, preferably a concatenative speech synthesizer having a relatively small vocabulary of stored sounds. Although the instructions require transmission and storage of more data than a pure text message, they still require significantly less data than digitized and compressed voice messages. The circuitry in the terminal receives instructions to play selected sounds from a small stored vocabulary. The instructions specify the sound and a number of playback parameters, such as attack, duration, decay and pitch. The synthesizer in the customer terminal device does not need to perform complex text to speech conversion operations.

The terminal device may be implemented in a variety of forms. The terminal may be a computer, such as a personal computer (PC) coupled to a data network. The invention also encompasses portable terminal implementations utilizing wireless communication.

As a result of the reduced processing as well as the use of a relatively small vocabulary and simplified control program, the customer's portable terminal device is much less complex and therefore cheaper to manufacture than would otherwise be the case. It also is easier to manufacture the terminal device in a small form factor.

As another advantage, it is possible to upgrade the text to speech processing on the network server. As a result, the terminal devices can produce upgraded synthesized speech outputs, without the need to upgrade the hardware or software of the terminal devices.

Aspects of the invention relate to systems, servers terminal devices and methodologies relating to message services utilizing the synthesizer instruction set to communicate information for synthesized speech reproduction.

For example, a system in accord with the invention comprises a server and at least one subscriber terminal. The server is coupled to a data communication network. The server is programmed to execute sequences of program instructions. The programming enables the server to obtain textual information to form messages for a plurality of subscribers. The server performs a significant portion of a text to speech process to convert the textual information of at least one of the messages to speech synthesizer instructions. The server transmits the speech synthesizer instructions over a data communication network. The subscriber terminal receives the speech synthesizer instructions via the data communication network. The terminal includes a speech synthesizer for synthesizing an audible speech representation of the message from the speech synthesizer instructions.

In the preferred implementation, the server comprises a programmed computer coupled to a data communication network, such as the Internet. Each speech synthesizer instruction generated by the server identifies a fundamental sound and at least one control parameter for controlling generation of a waveform corresponding to the fundamental sound.

The preferred implementation of the terminal includes a data interface for receiving data from a communication network. The interface may couple the terminal to the Internet, or the interface may comprise a wireless modem (e.g. a CDPD modem) for communication via a wireless packet data network. The terminal also includes a programmable central processing unit for processing received data to capture the speech synthesizer instructions. A memory in the terminal stores the set of fundamental sound samples, in digitized form. A concatentative speech synthesizer processes samples from the memory in an order specified by the instructions and controls parameters of each of the processed samples in a manner specified in the instructions. The synthesizer generates a speech waveform signal representative of the text information from which the sequence of instructions originally were generated in the server.

The server may receive news items from a number of sources to obtain the text messages for processing. Alternatively, the server may principally function to perform the text to synthesizer instruction processing. In the latter case, the server receives text mail type messages from other elements of the system, such as a mail server or a unified message management platform. To provide a personalized news service through this system, an information provider would operate an independent system for processing news materials and for profile matching. The provider's system would supply selected news items as textual mail messages to the mail server or the unified message management platform.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The drawing figures depict the present invention by way of example, not by way of limitations. In the figures, like reference numerals refer to the same or similar elements.

BEST MODE FOR CARRYING OUT THE INVENTION

The present invention utilizes one or more servers in a network to receive textual information and from that information develop or identify text messages for delivery to individual subscribers. The invention involves text to speech conversion. However, unlike prior systems where either the server or the terminal device performed the entire text to speech conversion operation, the present invention relies on a division of the conversion processing between a server and the terminal. The same server that accumulates the text messages or another server in the network converts the textual information in each message to a sequence of speech synthesizer instructions. That server transmits converted messages, containing the sequences of speech synthesizer instructions, to each identified subscriber's terminal device. A synthesizer in the terminal generates an audio waveform signal, representing the speech information, in response to the instructions.

The system of the present invention could use a variety of different types of speech synthesizer. The format of the instructions corresponds to the type of synthesizer utilized. The presently preferred embodiment utilizes a concatenative speech synthesizer with and associated vocabulary of stored fundamental sound samples. The instructions identify the sound samples, in the desired playback order. The instructions also provide parameters for controlling characteristics of the signal generated during synthesizer processing of each sound sample in each sequence. For example, the instructions may specify the pitch, duration, attack envelope and decay envelope, for each sample.

Figure 1:
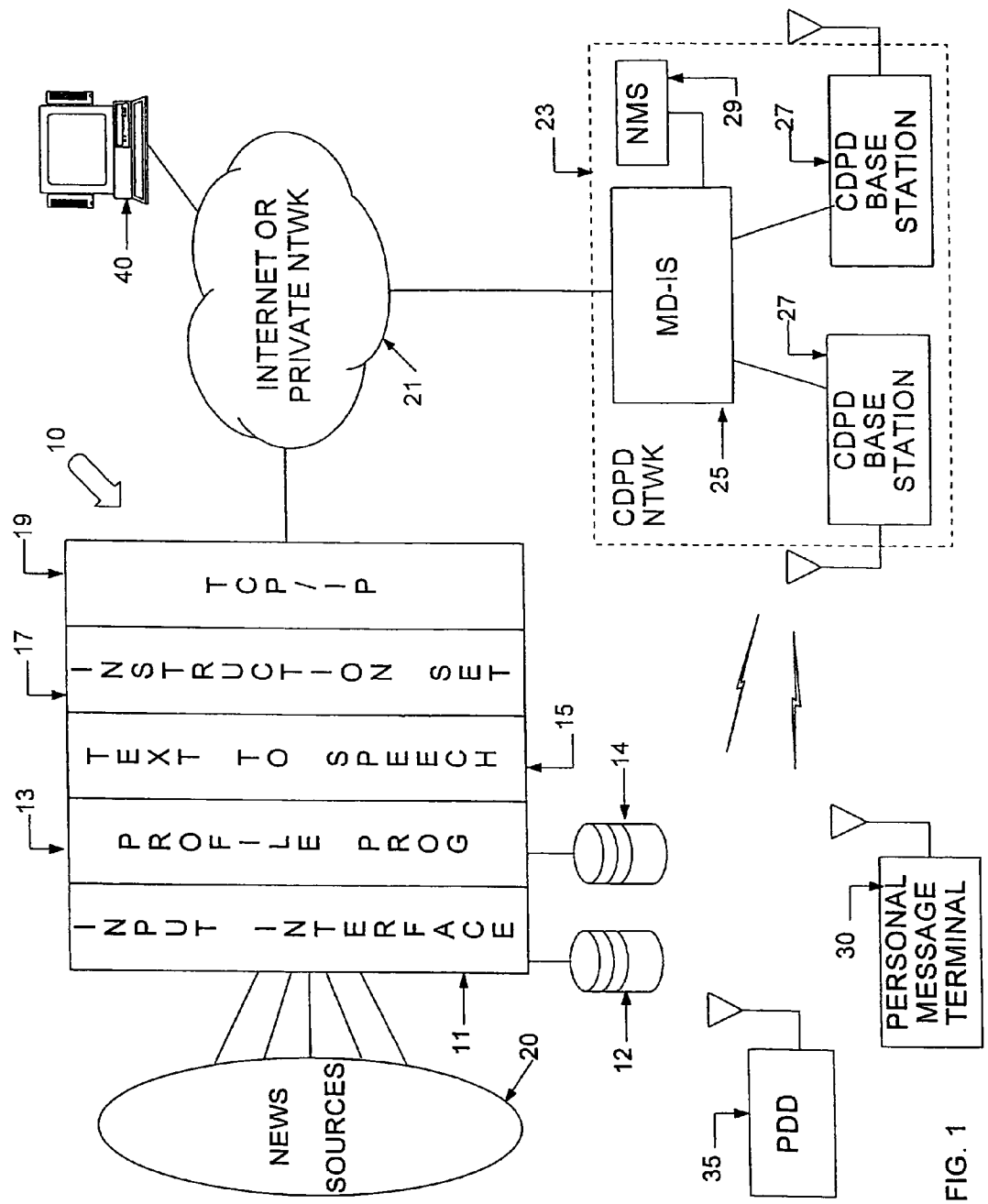
FIG. 1 is a high level functional diagram of a system implementing the present invention.

FIG. 1 shows a first embodiment of an overall system implementing a personalized message service in accord with the present invention. A service provider will operate one or more network servers 10. The server 10 comprises a computer system having one or more data communication interfaces 11 for obtaining information from a number of sources 20. The sources may provide a wide range of information, although for purposes of discussion here it is assumed that the sources provide various types of news information. Examples of the sources 20 include API, UPI, Nexus, Dow Jones and the like.

The server receives text information from the sources 20 and processes and/or parses the text into messages. The text messages may include E-mail, news-group postings and web page information. In the present example, the messages comprise individual news items. The messages are classified and stored in a database 12.

The computer server 10 runs an operating system, and various applications run on that operating system. For example, the computer operating as the server 10 runs an application program (not shown) for controlling the physical elements of the interfaces 11 and for processing, classifying and storing the input text messages. An associated application program 13 develops, stores and maintains subscriber profile records. This program receives subscriber inputs from various sources discussed below to develop each customer's profile and stores the profiles in a database 14.

The personal message service provides highly specific selection options, allowing each subscriber to establish a very personalized profile to control the selection of those news items each finds particularly interesting. For this purpose, the program software classifies news items received from various sources into a large number of different subject mater categories. Alternatively, the server may receive usenet or newsgroup messages as text, based on the user's profile and preferences.

There are a number of ways to enter the user profile information. The user could fill out essentially a card marking various categories and mail or fax that card to a service bureau. Personnel at the service bureau would input data from the card, either manually or using appropriate scanner, to provide the profile information for use by search engine software. Alternatively, a user might call in and talk to an agent who would enter the profile data into the system. As another alternative, the user could call in and listen to a series of menus and input selections as keypad signals on a telephone. Another way is to use a PC 40 to communicate with a WEB page site (not shown) on the Internet 21. In this manner, the user could pick topics from a menu or put in key words relating to topics of interest. In each case, the input profile information is entered into a file in the database 14, for use by the server 10 that receives and processes the incoming news information from the various sources 20.

When messages come in to the server 10 from the sources 20 and are stored in database 12, the program 13 also compares the classification and/or the content of each message or news item to the profiles of the various subscribers 14. When a text message matches a subscriber's profile, the program 13 forwards the message to another application program 15, for the initial portion of the text to speech conversion.

To forward messages to individual subscribers, in accord with the invention, involves a number of network operations relating to a conversion from text to synthesizer instructions as well as instruction formatting and transmission. These operations may be performed in a separate server communicating with the server which receives the input text messages and processes the messages in accord with the profile information. In the embodiment of FIG. 1, one computer server system coupled between the news sources 20 and a data network 21 performs the message accumulation and processing as well as the functions relating to conversion, formatting and transmission.

Each of the terminal devices 30 or 40 implement a concatenative type speech synthesizer. This type of synthesizer uses a database (stored vocabulary) of recorded natural speech sound samples. The synthesizer concatenates coded speech segments together in a specified sequence and performs some signal processing to provide inflection or intonation and to thereby smooth transitions between segments, to produce an electrical speech waveform signal. The server 10, in the network, determines the appropriate stored sounds and the parameters of the playback of those sounds, needed to produce a high quality speech output corresponding to the input text. The synthesizer in the terminal plays back the sounds selected by the server and in the manner specified by the server to reproduce the information from the original text message in a spoken language form.

The application 15 converts the text to the high level speech parameters (sound sample identifications and waveform control parameters) and a succeeding application 17 formats the speech parameters into an instruction set. A number of instruction sets and protocols may be used. The preferred implementation utilizes MIDI (Musical Instrument Digital Interface) commands, where the receiving terminal interprets the commands to control the speech synthesizer instead of a music synthesizer. The resulting instructions identify sequences of individual sounds for waveform synthesis and certain control parameters for each sound sample, which a synthesizer can use to ultimately synthesize a voice waveform to drive an audible output. The application 15 may store the sequences of instructions for the converted messages in another database (not shown).

The text to speech conversion process and the preferred instruction set are discussed in more detail below. However, at this point, it should be noted that the instruction set is specifically tailored for control of a synthesizer. The information is neither a digitized and compressed audio waveform nor a text message. The instructions require more bits to transmit information than if the message was sent as text, but the instructions require significantly less data than a digitized voice message, even if the voice message were compressed.

The computer operating as the server 10 also runs an application 19 to packetize the synthesizer instructions in a common packet protocol, preferably Transmission Control Protocol/Internet Protocol (TCP/IP), although a proprietary protocol may be used. The computer server 10 also includes a router (not separately shown). The router provides a two-way data communication connection to a packet switched data network 21 providing connectionless transport for TCP/IP packetized communications. This data network 21 may comprise the public network referred to as the Internet. Alternatively, a private data network may be used.

The TCP/IP protocol processing and the router enable the server 10 to transmit packets, containing the synthesizer instructions and related signaling information over the data network 21. In this fashion, the server can signal any data device coupled to the network and then send news items or other messages as sequences of synthesizer instructions, over the data network 21 and any other networks coupled thereto.

Of particular note, subscribers to the information service provided by the server 10 will have a variety of terminal devices. The terminal devices will have some means to communicate data, preferably via the network 21 to and from the server 10. Such terminals also will have a concatenative speech synthesizer capable of acting upon the sequences of instructions to produce synthetic speech outputs of the message information. Examples of the terminals include a personal computer (PC) 40 and a portable wireless terminal device, identified as a personal message terminal 30 in the drawing. Although not shown, the subscriber terminals may be implemented in other forms, for example, in a set-top terminal device for use with a digital broadband network.

The PC 40 here is an example of a data terminal device coupled to the data network 21 and capable of two-way data communication over that network. A PC, for example, might include a modem and access the Internet through a dial-up telephone connection through the Public Switched Telephone Network (PSTN) and an Internet Service Provider (ISP). Alternatively, the PC may connect to a local area network, having a coupling to the network of an ISP. In this case, the subscriber operates the PC 40 to send requests for specific messages and/or profile definition information through the network 21 to the server 10. From time to time, the PC 40 receives a series of packets representing news or other types of messages from the server 10. Once the complete set of instructions for a message has been downloaded and stored in the PC 40, the PC performs a synthesis operation to convert the entire message to a voice waveform, for audible output or for storage on an analog recording device.

The data network 21 also provides two-way data communications to a wireless data network. The present invention could utilize a number of existing wireless service networks, such as paging networks (preferably two-way), to provide the data communications from the server 10 to the customers' terminal devices. As another example, the wireless data network could use wireless relay transceivers and wireline access points of the type marketed by Metricom (Los Gatos, Calif.) as part of the Ricochet wireless network. Digital cellular networks such as CMA, TDMA, and GSM, also can carry data, for example, for the personal message service. Satellite based data networks, such as that operated by RAM Mobile Data, also are contemplated.

The presently preferred embodiment utilizes a cellular digital packet data (CDPD) network 23 as the wireless data network for communication with the personal message terminals 30. The CDPD network 23 provides two-way wireless data services to a portable or mobile terminal device, such as the personal data device (PDD) 35 and the personal message terminal 30.

Cellular Digital Packet Data (CDPD) operates as an overlay on an existing cellular telephone network, typically an advanced mobile phone system (AMPS) type analog cellular telephone network and operates over the same frequency channels. The CDPD network provides a wireless packet network service based on TCP/IP protocols.

As illustrated in simplified form, a local CDPD network 23 comprises one or more mobile data intermediate systems (MD-IS) 25, each of which has a TCP/IP connection to the landline data network 21. The MD-IS 25 also has data connections to a number of CDPD base stations 27, only two of which appear in FIG. 1.

The intermediate system (MD-IS) 25 has a primary role of forwarding data from one sub-network to another, for example between the base stations 27 and the link(s) to the Internet 21. The mobile data intermediate system MD-IS 25 performs data packet routing based on knowledge of the current location of each wireless subscriber station within the range of the mobile data base stations 27, which are under the control of the particular MD-IS 25. A number of mobile data base stations 27 can be under the control of a single mobile data intermediate system 25. In an actual installation, a number of mobile data intermediate systems are connected to each other through intermediate systems (not shown). The overall CDPD network is controlled by a network management system (NMS) 29 having an interface with at least one of the mobile data intermediate systems 25.

The typical base unit or mobile data base station 27 in a CDPD system utilizes an available channel within an AMPS cell to establish a link and communicate with a user's wireless station, such as the PDD 35 or the terminal 30. The CDPD system employs connectionless network services (CLNS) in which the network routes each data packet individually based on the destination address carried in the packet, knowledge of current network topology and the location of the user's wireless station in the network. The packetized nature of the data transmissions from each CDPD terminal device allows many CDPD users to share a common channel, accessing the channel only when they have data to send and otherwise leaving the channel available to other CDPD users.

The packet data service through this network 23 enables users to transmit and receive TCP/IP packet data at 19.2 Kbps over the cellular network channels, using any portable computing device and a CDPD modem. The CDPD network will support packet data services for a large number of users, many of whom many be simultaneously registered on the network. Some of the CDPD subscribers will be subscribers to the personal message service of the present invention.

CDPD terminals, such as 30 and 35, register through a base station 27 with the MD-IS 25, when active. Once registered as active on the wireless network, a CDPD terminal such as 30 or 35 can communicate packets of data in two directions, to transmit data upstream through the air link and a public data network (e.g. coupled to the Internet) and to receive data sent downstream from the public packet data network through the air link to the terminal. When not engaged in actual data communication, the CDPD terminal waits in an idle state until it receives data from the network or it needs to send data upstream through the network, for example in response to a user input.

For purposes of the present invention, the portable message terminal 30 includes a standard CDPD modem. The two-way CDPD communication enables the user to sign-on to the network 23, and through the networks 21, 23, to communicate with the server 10 providing the message service. In this manner, the terminal 30 can send service control data upstream, for example to input selections or new or updated profile information. When the server 10 has new information corresponding to the subscriber's profile, the server 10 initiates a transmission through the public data network (e.g. the Internet) 21 and the CDPD wireless network 23 to the subscriber's terminal 30.

The server 10 initially sends a notification message identifying the subject matter of the item. The terminal 30 or 40 stores this message and provides a beep tone or other alert to the subscriber, indicating receipt. The terminal either displays or delivers, as synthesized speech, information regarding the item from the notice message, in response to an appropriate user activation of the terminal.

The actual delivery of the packets containing the synthesizer instructions may operate in several different modes, depending on how the service provider elects to program the server 10 and the terminals 30, 40. The server may send the entire item through the network(s) for immediate storage in the memory of the terminal. With such an operation, the terminal would notify the subscriber upon completion of the download operation and would provide playback in response to a subsequent user activation. Alternatively, the terminal 30 or 40 may wait for a user activation to request downloading of the news item identified in the notice message. The terminal typically would initiate a playback upon complete reception of the actual news item through the network. Alternatively, the terminal may, as above, provide a beep tone or other alert to the subscriber indicating receipt. The subscriber can wait to request the download until she desires to listen to the newscast or other personal messages. Alternatively, if the subscriber is no longer interested in the subject matter indicated in the initial notice message, the subscriber can activate a key on the terminal 30 or 40, causing the terminal to send an instruction upstream to the server 10 telling the server to delete the news item from those currently stored for this subscriber.

The communications for the personal message service tend to be asymmetrical. The upstream transmissions typically consist of short bursts of data representing identification and registration information and the subscriber's selection and control inputs. During downloading to the terminal 30 or 40, the total data transmission is somewhat larger. As a rough rule of thumb, it is believed that 1 kbyte of text converts into approximately one minute of synthesized speech output. To transmit and store a twenty minute newscast for example would require approximately 20 kbytes of data if transmitted as text data. As noted above, the synthesizer instruction format increases the amount of data needed to convey the information somewhat.

The terminal receives and stores the synthesizer instructions from the TCP/IP packets and then processes the instructions to synthesize an audio waveform. Consequently, the transmissions from the server 10 to the terminal 30 or 40 need not occur in real-time, as transmission of speech in a two-way conversation must do.

Upon reviewing the initial notice message or upon listening to a news item, the subscriber can operate the keypad on the terminal device to input information for transmission upstream to the server regarding the particular item. The input information, for example may indicate how the subscriber rated the item in comparison to the subscriber's desired profile, i.e. as a match to the subscriber's desired news information or as not matching the subscriber's needs. This causes the profile 13 of the subscriber to be updated and, therefore, improved in its ability to correctly match content to the subscriber's needs. Another example of a subscriber input might be an instruction to the server 10 to forward the item to one or more identified persons. If the message presented relates to an advertisement or offer, the subscriber input may initiate a purchase or other transaction related to the message.

A significant feature of the invention relates to the allocation of the functions involved in converting text messages to synthesized speech waveforms for audible presentation to the subscribers. To better understand this aspect of the invention, a high level explanation of these functions with reference to FIG. 2 may be helpful.

The process of text to speech conversion involves three major operations. The first operation involves the computation of linguistic parameter specifications, such as phoneme sequences and accent parameters, from the input text data. The second operation involves the conversion of the linguistic parameters into actual synthesizer control parameters, such as concatenative unit indices, pitch and duration. In the third operation, a concatenative synthesizer receives the control parameters, and in response, concatenates and processes sequences of sound samples from its vocabulary database to generate the actual sound waveform.

Figure 2:
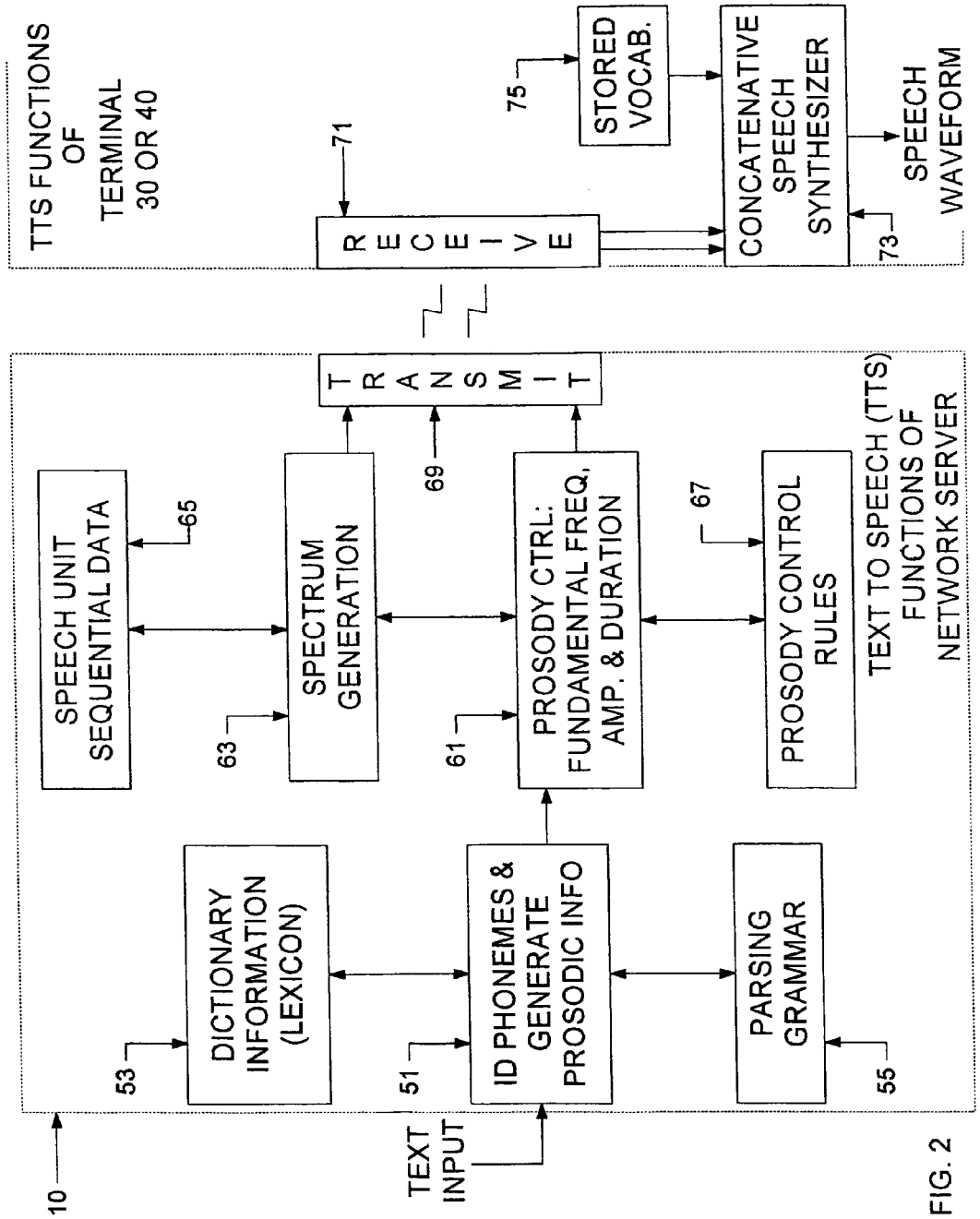
FIG. 2 is a block diagram of the operations involved in converting input text to speech, and illustrates the division of these functions between the network server and the terminal device.

FIG. 2 depicts the functions involved and the breakdown of these functions between the network server 10 and the terminal device 30 or 40. As shown, function 51 receives the text input and generates the linguistic parameter specifications, including identification of phonemes in sequence and various prosodic information. To perform this calculation, the generation process 51 uses a grammar 55 for parsing the text and dictionary information 53 relating to the lexicon of the particular text language (e.g. English). English is only used as an example, and not meant to exclude any language.

The operation of the process 51 to generate the phoneme and prosody information from the input text corresponds to the first basic function of text to speech conversion.

The process 51 supplies the indices of the phonemes together with the prosodic information to a prosody control function 61. In response, the function 61 applies a set of prosody control rules 67 to generate fundamental frequency, amplitude and duration data. The prosody control process also interacts with a spectrum generation operation 63. The operation 63 uses stored speech sequence data 65 to generate spectrum information characterizing the speech. Together, the prosody control function 61 and the spectrum generation operation 63 perform the second major function of the text to speech conversion, i.e. the conversion of the linguistic parameters into actual synthesizer control parameters.

In order to ultimately create synthesized human speech, the outputs from the prosody control function 61 and the spectrum generation operation 63 need to go to the actual waveform generation process. In accord with the invention, the operations to this point all are performed in the server 10, within the network. The outputs from the prosody control function 61 and the spectrum generation operation 63 go to a transmit operation 69, which formats the information for transmission through the network(s) 21 and 23.

In the terminal, a process 71 receives the formatted synthesis information via the network(s) 21 and 23. The receive process 71 forwards the fundamental frequency, amplitude and duration data and the spectral information to the speech synthesizer 73. Generically, the speech synthesizer 73 uses this information to control the generation of an analog waveform, which provides a synthesized representation of the input text in speech form. The preferred embodiment utilizes a concatenative speech synthesizer 73. The received information identifies sequences of specific sound samples (phonemes, and a number of diphones and/or triphones) stored in digital form, as a vocabulary 75. The received information also provides control parameters, such as frequency (or pitch), attack or decay and duration, which the synthesizer 73 uses to adjust playback of each individual sound sample. In this manner, the synthesizer 73 concatenates and processes sequences of sound samples from its stored vocabulary 75 to generate the actual sound waveform in accord with the sequence of instructions from the server 10.

Due to the division of the functions involved in text to speech conversion between the server and the subscriber's terminal, it becomes important to efficiently transfer the speech synthesis instructions between those elements of the system.

In accord with the present invention, the subscriber's terminal device 30 or 40 includes a memory storing a small vocabulary of speech sounds. This vocabulary includes all of the basic phonemes found in human speech as well as the most common diphones and triphones. In operation, a microprocessor in the terminal retrieves a selected sound sample from memory and supplies the sound sample to the appropriate digital signal processor operating as the synthesizer. The microprocessor also sends parameter control instructions to the synthesizer. The control instructions specify the manner in which the digital signal processor (synthesizer) processes each digitized sound sample for waveform signal synthesis, for example by modifying the digital values of the sample to adjust the attack and decay, the pitch, and/or the duration of the sample. The microprocessor selects the sample and generates the instructions for playback in response to the synthesizer instructions received from the server 10.

The data representing the synthesizer instructions for communicating the information content from the textual news item message, in accord with the invention, takes the form of a reduced instruction set for controlling the speech reproduction operations of the terminal device. The reduced instruction set provides more information than pure text, but less information than digitized and compressed speech. Each text message is translated into a series or sequence of instructions relating to the sounds that the synthesizer in the terminal needs to reproduce. Each of the transmitted message instructions will specify one of the stored samples and the manner of synthesis of the signal for that sample. A variety of protocols could be used to carry the reduced set of instructions for the news item messages. The presently preferred embodiment utilizes the MIDI protocol.

The Musical Instrument Digital Interface or 'MIDI' protocol is designed to enable electronic devices, such as music synthesizers and computers, to interact and work in synchronization to produce audible musical outputs. Communication may be one-way (send only or receive only), or communication may be two-way (send and receive). The MIDI protocol defines messages for sending control information from a source, typically a MIDI controller, to a destination via a data stream. The typical MIDI commands translate human gestures, such as key presses and releases on a keyboard, into MIDI messages. The typical destination is a tone module of a synthesizer, but there are now many different types of devices that use MIDI to communicate.

In accord with the invention, the MIDI protocol is used to identify the sound samples for synthesis and to specify aspects of the manner of waveform synthesis. A summary explanation of the message formats of this preferred protocol may be helpful.

MIDI communications utilize multibyte messages consisting of one status byte followed by one or more data bytes. The status byte determines what operation the MIDI destination should perform. The data bytes define the information necessary for that operation to take place. Since MIDI messages can contain either one or two bytes of data the receiver must scan the incoming stream of MIDI bytes for discrete messages of different lengths. The protocol facilitates this by byte type recognition by insuring that status bytes and data bytes are "partitioned" into unique value ranges, such that no status byte can be confused with a data byte and vice versa.

Status bytes have their most significant bit (MSB) set to differentiate them from data bytes. With the MSB set, the status bytes range in value from 128 to 255, which means that there are one hundred twenty-eight possible values of the status bytes. With the MSB off, the data bytes range in value from 0 to 127, which means that there also are one hundred twenty-eight possible values of the data bytes. Since the two types of bytes are partitioned it is easy for the MIDI receiver to assemble incoming messages from the byte stream, by spotting status bytes and treating all bytes until the next status byte as data bytes for the same message.

Stated another way, a device receiving a series of bytes assumes that data bytes relate to the most recent status byte until it detects another status byte.

The MIDI message data is transmitted in 10-bit packets each consisting of a "start bit" followed by 8 information bits (the byte) followed by a "stop bit". The MIDI receiver accepts the incoming data stream at its MIDI interface and assembles the regular flow of 0's and 1's (bits) back into the byte-size MIDI messages.

The MIDI protocol is capable of separating information into sixteen logical channels. The protocol standard specifies the format of Channel Messages and System Messages. Channel Messages apply to a specific channel identified by a 4-bit number included in a status byte of each of these messages. System messages are not channel specific, and no channel number is indicated in their status bytes. Channel Messages and many of the System Messages consist of one status byte followed by one or two data bytes, except for system exclusive messages, which have an arbitrary number of data bytes.

Consider a Note On message as an example. The Note On message begins with a status byte containing the "note on" operation code (1001 binary, or 9 decimal) together with the 4-bit identifier of the relevant channel affected. The Note On message also includes two data bytes. When used with an instrument, the first data byte of this message defines the key that was depressed on the controller, whereas the second data byte defines the velocity at which the user pressed the key.

For purposes of transmitting speech synthesizer instructions, in accord with the invention, the Channel Messages typically will comprise a status byte and two data bytes. The status byte identifies the relevant action. For example, the Note On command indicates a start of sample synthesis, whereas Note Off indicates a termination of synthesis of a particular sample. The speech synthesis process does not utilize separate channels as such, therefore the 4-bit channel identifier in the status byte can be used to represent a first control parameter, for example a frequency offset for the beginning or end of a sample to identify sets of samples, or to specify different voice fonts. In response to a frequency offset, for example, the synthesizer might adjust the beginning or ending pitch of a sample, to achieve a desired inflection and/or blending with a preceding or succeeding sound sample.

The first data byte of a Channel Message is used to identify the sound sample for playback. As noted, above the MIDI protocol uses data bytes having a range of 128 different values, this enables selection of 128 sound samples from the stored vocabulary. This vocabulary includes all of the basic phonemes found in human speech as well as a number of the most common diphones and triphones. The second data byte specifies another control parameter, such as angle of attack or decay.

The MIDI standard also specifies a format for a MIDI Time Code (allowing synchronization). Each of the files containing a news item message in MIDI protocol form will also include replay time-stamp messages, to enable the microprocessor in the terminal device to synchronize the playback. For example, the timing information in the file will enable the microprocessor to determine the timing between Note On and Note Off messages for a particular sound sample, and thus calculate the appropriate duration of the sound output for the identified sample.

Figure 3:
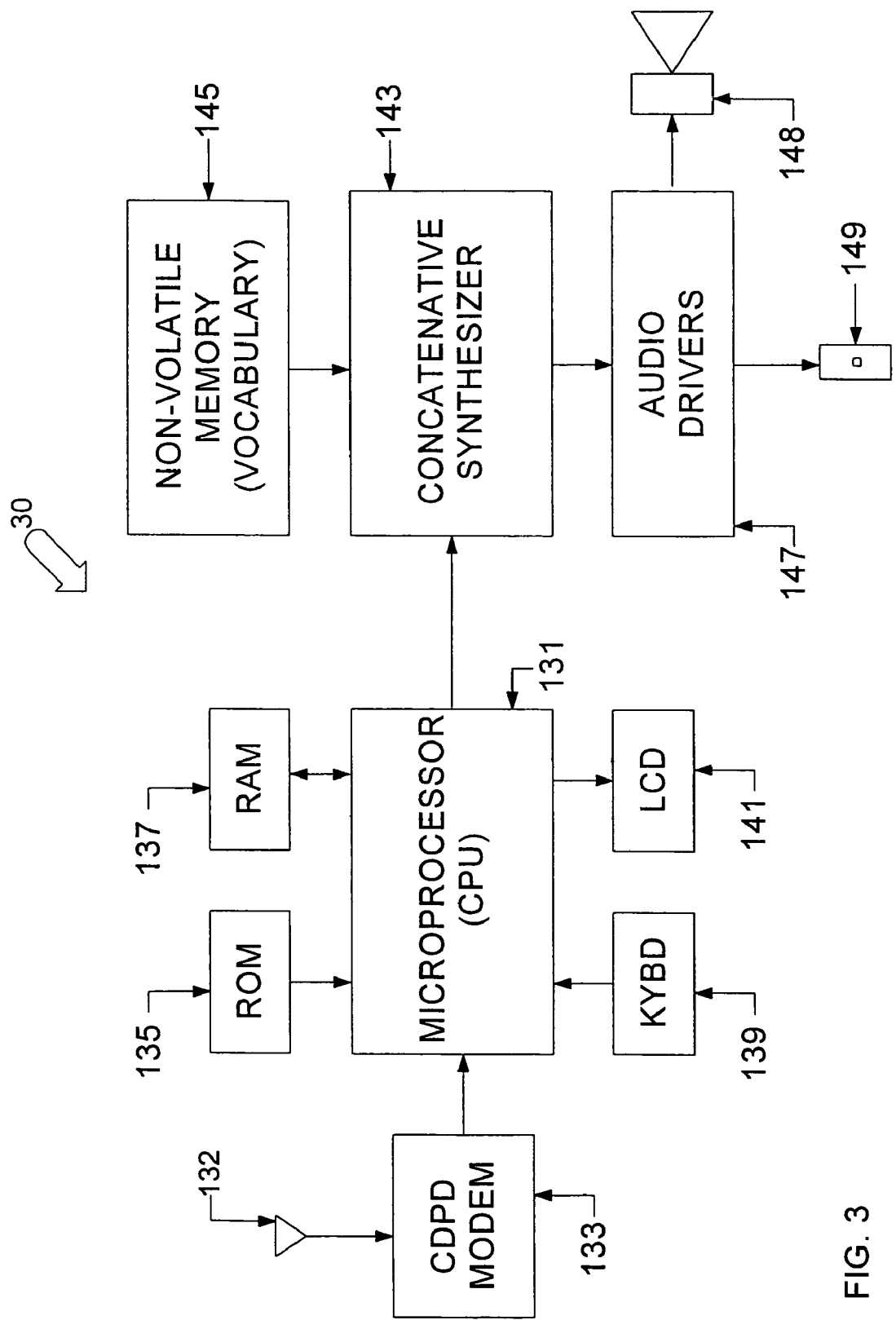
FIG. 3 is a simplified block diagram illustrating the significant functional components of a portable terminal for use with the system of FIG. 1.

FIG. 3 is a functional block diagram of the elements of a preferred embodiment of a portable, wireless terminal device that may serve as the terminal 30 in the system of FIG. 1. The terminal is an intelligent device, with a microprocessor 131 acting as the programmable central processing unit (CPU), to control all operations of the terminal 30.

At least a portion of the control code controlling the functions of the microprocessor 131 are stored in a read only memory (ROM) 135. Although not shown, the terminal also may include a non-volatile memory (EEPROM or Flash memory) storing programming code that may be modified to upgrade the operations of the terminal. The portable terminal 30 also includes one or more working memories, such as the random access memory (RAM) 137, cache memory (not shown) and the like.

The personal message terminal 30 includes a display driver (not shown) and a small display such as a liquid crystal display 141. A user operates a keypad or keyboard 139 to input various information to the microprocessor 131. The keyboard and display represent elements providing a user interface. Those skilled in the art will recognize that the terminal may incorporate elements providing other user interfaces, such as a touch sensitive LCD screen and/or "soft key" interface.

The terminal includes an antenna 132 and wireless data modem, for example a CDPD modem 133. The modem 133 is coupled to the microprocessor 131, for two-way wireless packet data communication via the network 23. The two-way data communication via the network 23 and modem 133 may enable a variety of data communication services. For purposes of the invention, these communications allow the terminal 30 to send relatively low speed data upstream, such as user inputs of selection and profile information and these communications allows the terminal 30 to receive TCP/IP packets containing control signaling information as well as the packets carrying the actual speech synthesizer instructions. The microprocessor 131 stores received sequences of instructions, e.g. in MIDI form in RAM 137.

The microprocessor 131 also is coupled to a speech synthesizer 143. The preferred implementation of the portable terminal device 30 utilizes a concatenative type synthesizer. A non-volatile memory device 145 stores a vocabulary of digitized sound samples. The non-volatile memory 145 may be a flash memory, an EPROM or a ROM, depending on whether or not it is desirable to allow reprogramming of the vocabulary.

The synthesizer 143 provides an audio frequency analog signal, representing the synthesized speech waveform, to one or more audio drivers 147. The drivers 147 amplify or attenuate the analog signal level, as necessary, to provide the appropriate power for particular outputs. In the illustrated example, the drivers 147 provide an output to a loudspeaker 148 and well as an output to a jack 149 for headphones or a connection to a stereo system.

Although the microprocessor 131 may run other programs, if the terminal provides other services or functionalities, the control program for the microprocessor 131 at least includes the routines necessary for providing the user interface, e.g., through the keyboard 139 and the LCD 141, the routine for controlling the CDPD modem 133 for data communication, and the routines for specifically sending and receiving the various messages relating to the personal message service. In this regard the program facilitates processing of user inputs to provide display, and when appropriate, to send input information through the networks to the server 10. The program also includes one or more subroutines for message receipt and playback through the synthesizer 143.

For speech synthesis messages received from the server 10, the communication processing routine processes the TCP/IP packets supplied to the PC through the modem 133 to recover the sequences of synthesis instructions. In the preferred embodiment, the communication processing routine in the terminal 30 recovers the MIDI instructions, discussed above. The microprocessor 131 may run a routine to process these instructions to identify the sound samples and pass the identities of the samples, in the specified sequence, to the synthesizer 143. The microprocessor 131 also processes the synthesizer instructions, for example in MIDI form, to convert the playback parameter information to an instruction set for the particular model of the synthesizer 143.

In response to the sample identities, the synthesizer 143 retrieves the digital samples from memory 145, in the sequence specified in the received instructions. The synthesizer 143 processes the digital sound samples to adjust the playback parameters, such as attack, duration, amplitude, pitch and decay, as instructed by the microprocessor 131. The synthesizer 143 converts the processed digital signals to at least one audio signal and supplies that signal to the audio drivers 147. As a result, the output device, such as the loudspeaker 148 produces an audible acoustic signal representing the synthetic speech interpretation of the text message originally received and processed in the server 10.

If the terminal 30 utilizes a writable memory, such as a flash EPROM, to store the programming, the programming run by the microprocessor 131 may be downloaded into storage. Of particular note here, the various applications, including the application for the messaging service may be received via the network 23 and the modem 133. Also, the data reception may be useful in downloading upgraded versions of the fundamental sound sample vocabulary, for storage in memory 145.

The subscriber's personal terminal device 30 may take a variety of forms. The presently preferred embodiment is a form similar to a Walkman cassette player or CD player with a speaker and/or earphones and a jack for connection to a stereo system, for example in a car. In another alterative implementation, the subscriber's portable terminal device would utilize a form factor compatible with operation in a cassette player. The device would receive and store the messages from the wireless CDPD link. However, when inserted into the cassette player, motion sensors in the device would detect operation of the tape drive spindles to derive appropriate control signals for synthesis, program selection and audio output operations. The device would include a transducer to output audio signals to the tape head of the cassette player for reproduction via the audio system of the player, e.g. through the stereo system of an automobile.

The personal message terminal is a wireless terminal device implementing a user interface, receiving and storing instructions and providing speech output in response to the synthesizer instructions transmitted by the server 10. The embodiment of FIG. 3 is a representative example of such a terminal, however, other implementations may be used. For example, the personal message service terminal 30 may be implemented as a portable PC (laptop or palmtop) having a wireless data modem and a sound card. The functionality may also be integrated into an "Internet telephone", "cellscape phone" or "smart phone", capable of both sending and receiving live voice conversations and of sending and receiving text over a TCP/IP net using CDPD.

Figure 4:
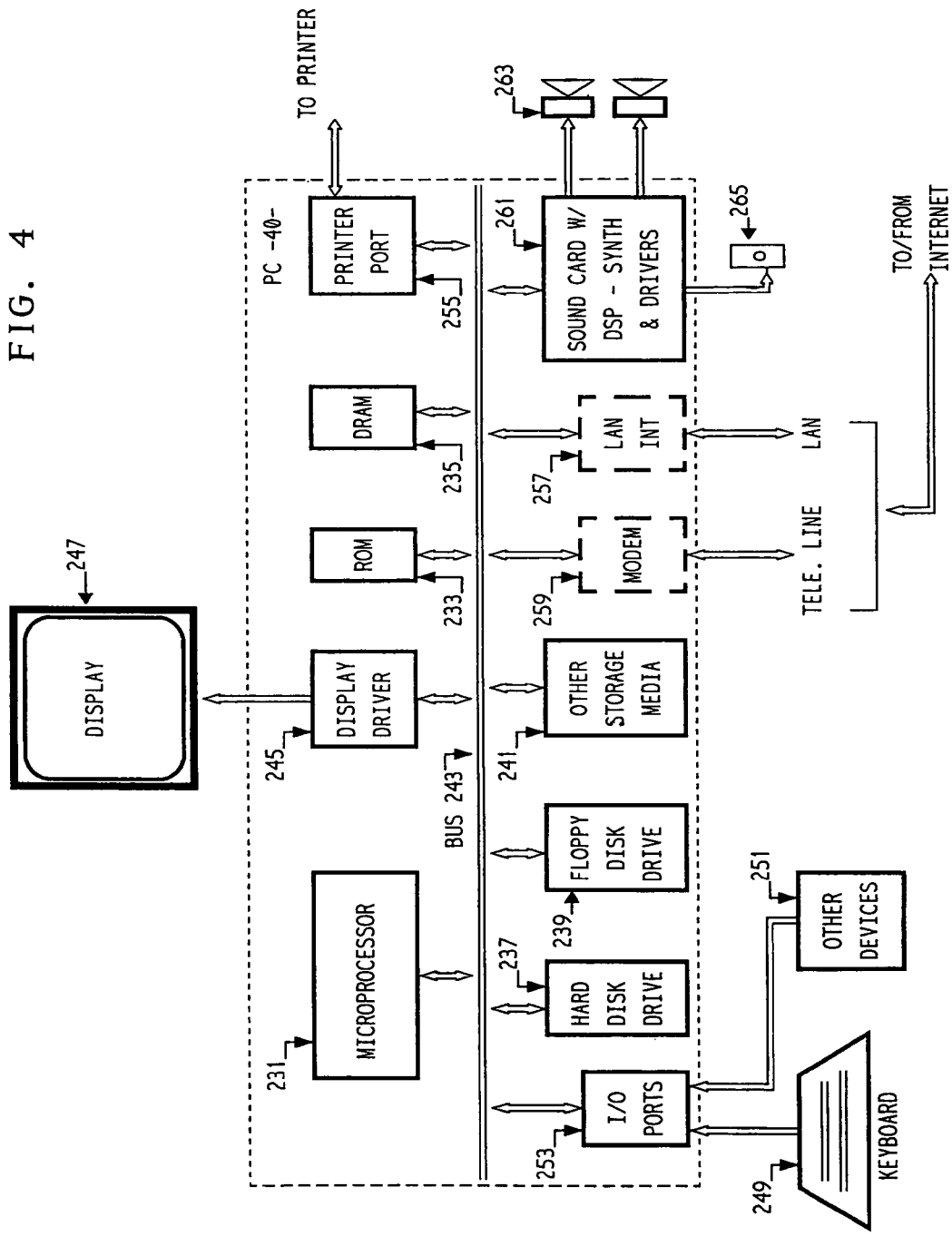
FIG. 4 is a simplified block diagram illustrating the significant functional components of a desk-top personal computer (PC) for use as another type of subscriber's terminal in the system of FIG. 1.

FIG. 4 is a block diagram of the functional components of a PC type implementation of a data terminal capable of receiving voice synthesis instructions from the server 10. The main processing element of the PC 40 is a programmable central processing unit (CPU). In the illustrated example, the CPU is a microprocessor 231. The control code for certain basic functions of the microprocessor 231 are stored in a read only memory (ROM) 233. The PC terminal 40 also includes one or more working memories, such as a dynamic random access memory (DRAM) 235, cache memory (not shown) and the like. The microprocessor 231 runs programs loaded into the DRAM 235 from other storage devices.

To store programs and data files for use by the programs, the PC 40 includes a number of different bulk storage systems. In the illustrated example, the PC 40 includes a hard disk drive 237 and one or more floppy disk drives 239; and the PC may include other storage media 241, such as a CD ROM drive, a Jazz or Zip drive, a digital tape drive, or the like.

An internal bus system 243 provides two way data communications between the various elements of the PC 40. In particular, the microprocessor 231 receives digital signals from and sends a variety of digital signals to the other computer components via the bus 243.

The PC 40 typically connects through a display driver 245 to a display 247, such as a color cathode ray tube (CRT) type monitor. A laptop or palmtop implementation of the PC typically utilizes a flat panel display. A user operates a keyboard 249 or another type of input device 251, such as a mouse, trackball, touch screen, or joystick, to input various information to the terminal 40. The input devices 249, 251 connect to the PC 40 through appropriate input ports, represented generically by the block 253 in the drawing.

The PC 40 includes one or more systems enabling communication with other data systems, such as a printer port 255 coupled to the bus 244. The PC 40 also includes one or more data interfaces, to facilitate the communications via the public packet switched data network 21.

There may be data interfaces such as interface 257 to a local area network (LAN). In such an implementation, the LAN would connect to equipment of an Internet Service Provider (ISP) to provide communications for the terminal 40 over the Internet 21.

Alternatively, the data interface in the PC 40 may be a modem 259. The modem 259 provides a two-way data communication coupling to a telephone line or other communication network link. The modem sends and receives electrical, electromagnetic or optical signals which carry digital data streams representing various types of information in the format appropriate to the particular link. The dial-up telephone link may go to an information service provider, such as America Online or Compuserve. Alternatively, the PC may use a dial-up telephone link direct to an ISP or private TCP/IP network.

Thus, the data interface and associated network link provide data communication through one or more networks to other data devices. For example, the modem 259 may provide a connection through the local telephone network to a host computer or to data equipment operated by an Internet Service Provider (ISP). The ISP equipment in turn provides data communication services through the world wide packet data communication network now commonly referred to as the 'Internet' 21. The local telephone network and the Internet both use electrical, electromagnetic or optical signals which carry digital data streams.

The data communication interface 257 or 259 thus enables the PC 40 to send and receive digitized data over the network 21. The data communications may relate to a variety of applications or services. In accord with the invention, one application that utilizes this data communication capability is the personal message service. In this regard, the LAN interface 257 or modem 259 enables the PC terminal 40 to send data messages through the network 21 to the server 10, for example to input profile information. The LAN interface 257 or modem 259 also enables the PC terminal 40 to receive data relating to this service.

The data received by the PC 40 via the network 21 includes signaling information, for example notices indicating when news items or other messages are ready for transmission to the particular terminal. The data received by the PC 40 via the network 21 also includes the sequences of speech synthesizer instructions forming the converted messages. Typically, the microprocessor 231 recaptures the MIDI instructions from the received packets and accumulates a data file containing the entire set of MIDI synthesizer instructions corresponding to at least one message. The microprocessor stores this data file, for example on one of the disk drives 237, 239.

As discussed more later, the PC 40 stores application programs including the routines for receiving an processing the signaling messages and converted messages for the personal message service. Such applications may be loaded into storage on the PC in several ways, e.g. by transfer from a floppy disk or CD ROM. Of particular note here, the various applications, including the application for the messaging service may be received via the network 21 and the data interface 257 or 259. This capability may be particularly useful in downloading upgraded versions of the fundamental sound sample vocabulary.

The PC 40 also includes a sound card 261 coupled to the bus 243. The sound card receives instructions over the bus 243 from the microprocessor 231 and receives digital sound samples from a storage device. The samples may come from long term storage on the hard drive 237, but preferably, during actual synthesis, the sound card receives the sound samples from temporary storage in the DRAM 235. In response, the sound card 261 generates analog audio output signals.

For speech generation purposes, the sound card 261 includes a digital signal processor that processes the digital sound samples to adjust the playback parameters, such as attack, duration, amplitude, pitch and decay, and converts the processed digital signals to one or more (e.g. stereo) audio signals. The sound card 261 also includes one or more audio driver circuits for amplifying or attenuating the analog signal level, as necessary, to provide the appropriate power for particular outputs. In the illustrated example, the sound card provides an output for two loudspeakers 263 as well as an output to a jack 265 for headphones.

The microprocessor 231 runs an operating system program, which controls operations of application programs. The programs define how the microprocessor 231 respond to signals from the input devices 249, 251 and produces signals through the driver 245, to effectuate a desired user interface. For example, a computer running a Windows type operating system and Windows compatible application programs provides a graphical user interface, for the operating system functions as well as for most of the applications running on the operating system.

One of the application programs facilitates the personal message service provided by the operator of the server 10. This program may enable two-way graphic and text communication, similar to a web browser, to allow the user to control the service and to input profile information. The personal message service application program also includes one or more subroutines for message receipt through the data interface 257 or 259 and playback through the sound card 261. The program, typically stored on the hard disk 237, has an associated database which contains the fundamental sound vocabulary for use by the synthesizer on the sound card 261. However, because of the relatively small size of the vocabulary, this database can be loaded into the DRAM 235 with the program for use during program execution, i.e. during actual playback.

For messages containing synthesizer instructions received from the server 10, the communication processing routine processes the TCP/IP packets supplied to the PC 40 by the network 21, to recover the synthesis instructions. In the preferred embodiment, the communication processing routine in the PC recovers the MIDI instructions, discussed above. The microprocessor 231 may run a routine to process these instructions to identify the sound samples and cause the transfer of the samples, in the sequence specified in the instructions of the converted message. The samples are sequentially transferred from memory 235 to the sound card 261 over the bus 243. The microprocessor 231 also processes the synthesizer instructions, for example in MIDI form, to convert the playback parameter information to an instruction set for the particular synthesizer functionality of the sound card 261, to enable the sound card to adjust the parameters of each sample during waveform synthesis.

In this manner, the sound card 261 receives the sound samples and appropriately formatted playback instructions over the bus 243. The sound card processes the samples per the instructions to produce the desired synthetic speech output signal. The output signal may go to an audio transducer such as loudspeakers 261 for immediate presentation of the playback, or to an analog storage device for later playback.

The above discussion of the terminals 30, 40 assumed use of generic synthesizer equipment to process sound samples and produce synthesized speech outputs. The MIDI processing generally was implemented in software. An alternative approach might implement the synthesizers in the terminals using MIDI compatible chips and move all MIDI processing to those chips. Existing MIDI chips process digital samples from memory, normally to produce musical outputs. For purposes of the invention, however, a MIDI chip in the terminal 30 acting as the synthesizer or a MIDI chip on the sound card 261 would utilize the stored vocabulary as its sound samples. The MIDI chip would process the vocabulary sound samples in direct response to the synthesizer instructions received via the networks 21, 23, to thereby synthesize the desired speech output.

Figure 5:
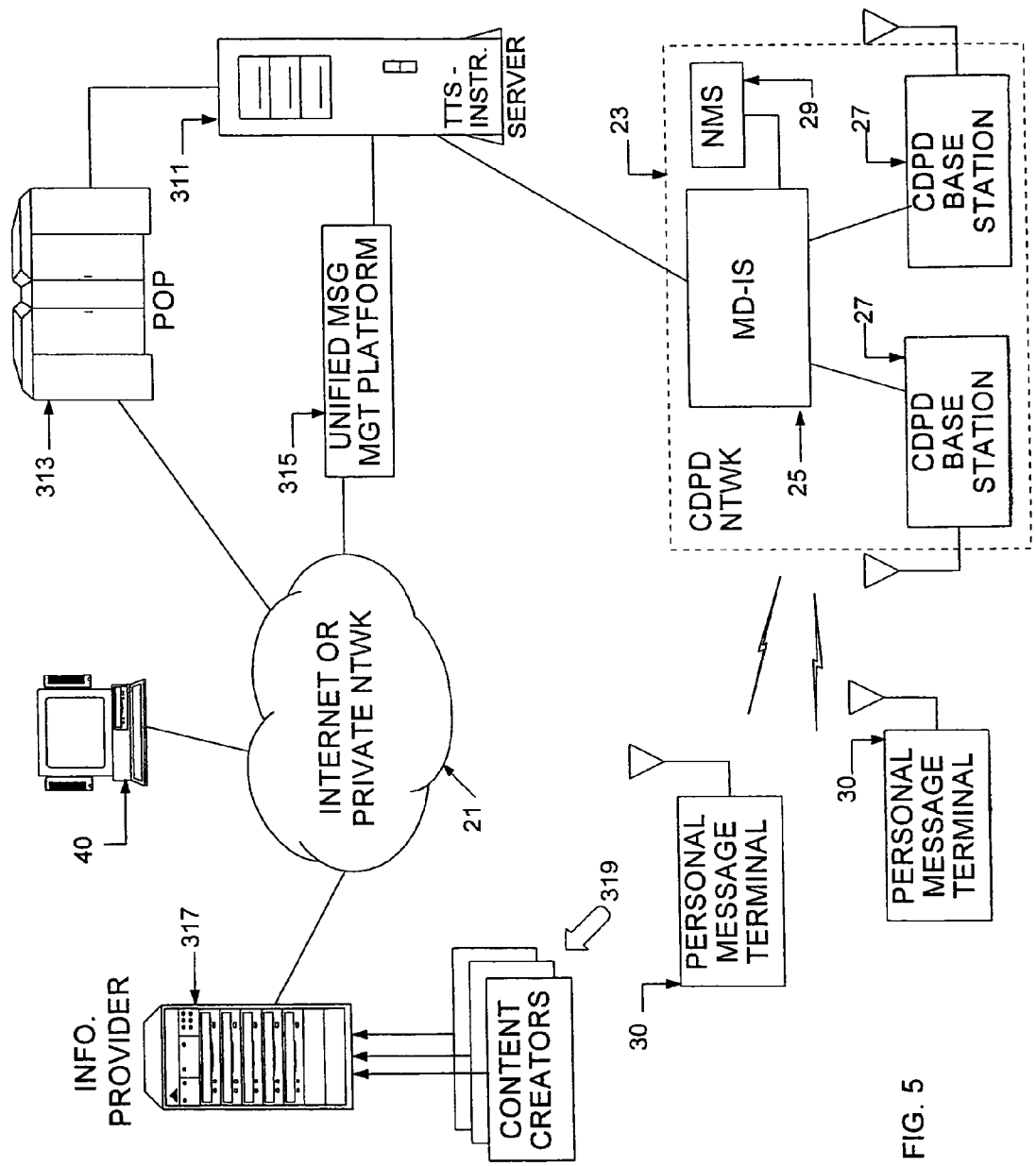
FIG. 5 is a high level functional diagram of a somewhat modified system for implementing the present invention.

FIG. 5 illustrates a somewhat different network implementation of the present invention. In particular, this version of the overall system depicts elements for providing news messages and the like as well as other types of messages, such as mail.

Like the earlier embodiment, this implementation utilizes elements of a CDPD wireless network 23, and to the extent that such elements are similar to those in the earlier embodiment, further explanation thereof should be unnecessary. This implementation utilizes the personal message terminals 30, each of which has CDPD communication capabilities and a synthesizer for producing speech outputs from files containing the reduced set of speech reproduction instructions, as discussed above. This network implementation also supplies messages to a PC 40, which may be essentially the same as discussed above, but there may be some differences in how the information provider(s) offer service to those and other terminal devices directly coupled to the Internet 21, as will be discussed later.

In this implementation, the communication service provider operates a server 311 for performing the conversion of text to speech instructions. The server 311 receives text messages addressed to individual subscribers from a number of sources discussed more below. The server 311 converts each text message to the appropriate speech instructions, for example in MIDI format, and packetizes and addresses the instructions for transmission through the CDPD network 23 to the terminals as in the earlier embodiment.

In this implementation, the server 311 operated by the communication service provider does not itself process new information inputs and formulate or select text messages for individual subscribers. This particular server only processes messages from other sources. Preferably, the server 311 receives messages in the form of mail from another level of server. The illustrated examples of the sources supplying mail to the server 311 include a post office protocol (POP) server 313 and a unified message management platform 315.

The subscriber would subscribe to the CDPD network service, to the text to speech instruction conversion service and to a mail service, such as provided by the POP 313 or the unified platform 315. The appropriate mail service POP 313 or platform 315 receives E-mail and/or other mail from a variety of sources and forwards the mail as text messages to the text to speech instruction server 311.

One source of the mail messages, for example, might be an information service provider operating on the data network 21. The provider would operate a normal data server 317 coupled to the Internet 21. The server 317 would receive and store profile data from customers, similar to the earlier embodiments. This server also would receive text data inputs from various sources operated by content creators 319. The source or input information may be virtually any type of information capable of expression in a text format and preferably includes at least types of information similar to those discussed above relative to the first embodiment.

The information provider's server 317 accumulates news reports or other messages of interest to particular subscribers. The server 317 transmits selected news reports based on the subscribers profile information to the subscribers, as E-mail messages, through the Internet 21. In a normal manner, the information provider's server 317 transmits the E-mail messages to a server providing the E-mail service for each subscriber, such as the POP server 313 or the platform 315. The mail server 313 or platform 315 provides mail access enabling the subscriber to receive the message. For example, if the subscriber has a data terminal with access to the Internet 21, such as a PC 40, the subscriber may elect to receive the messages as textual E-mail messages, in the normal manner.

For purposes of the wireless service implementation of the invention, the E-mail messages go to the particular POP 313 or platform 315 that is coupled to the text to speech instruction server 311. For this discussion, assume that the E-mail message goes to the POP 313.

Upon receiving appropriate commands from the speech server 311, the POP server 313 transmits all of the E-mail messages for the subscribers using the wireless personal message terminals, including the news reports from the information provider's server 317, to the text to speech instruction server 311. In response to each message, the text to speech instruction server 311 in turn generates the speech instructions, formats the instructions for CDPD transmission and sends the converted message through the CDPD network 23 to the particular subscriber's terminal device 30, essentially as in the earlier embodiment.

The POP server 313 may be a normal E-mail server that the subscriber uses for his regular E-mail, for example provided by the subscriber's Internet Service Provider or the subscriber's employer. In such a case, the POP 313 forwards E-mail messages to the portable terminal when the subscriber's terminal has registered as on-line through the CDPD network 23. At other times, the subscriber can retrieve E-mail messages in the normal manner, for example using a desk-top PC 40.

If the subscriber has a PC 40 capable of synthesized speech presentation, as in the earlier embodiment, the subscriber also may elect to receive the news and/or other mail messages in synthesized speech form. In such a case, the POP server 313 would obtain a conversion of each text message to the speech instruction format, from the server 311. The POP server 313 would then provide the message, containing the speech synthesizer instructions, to the PC 40 through the Internet 21 for speech synthesis as in the earlier embodiment.

Preferably, the POP server 313 is operated by the service provider that operates the text to speech instruction server 311. The E-mail address of the terminal 30 or 40 for that service may be different than the subscriber's public E-mail address. In this case, the E-mail addresses for the messaging service would be kept relatively secure. In some cases, the subscriber may not even know the address. The personal message service provider and/or subscriber may give the E-mail address only to selected information service providers, such as provider 317, who forward news messages or the like to the subscriber. The subscriber also may choose to give the address of the terminal 30 only to important customers, vendors, coworkers or associates.

The unified message management platform 315 normally receives mail messages as voice messages over the telephone network, as facsimile messages, as E-mail messages over the Internet 21, etc. The platform also provides conversion between the formats, for example, from facsimile to text as selected by the subscriber, to facilitate a subscriber select form of delivery. The platform 315 provides a single point of contact or a single mail box, if you will, which receives and stores all these different types of messages and from which the subscriber can directly retrieve the various types of messages or direct them to another terminal device.

Thus, a variety of message types may come to a subscriber on the one unified message platform 315, e.g. as E-mail, as voice mail, or as fax, and the subscriber can access all of these messages through the one platform. The platform 315 provides an indication to the subscriber that it has received a message, for example by providing notice over a telephone link or pager or on-screen notification on a PC 40 that is connected and registered on the platform 315. Then either using a telephone as a control device, or a computer as a control device, the subscriber controls that platform to deliver the message in a desired manner. The platform includes certain conversion capabilities, for example to convert text to speech for playback of E-mail over the telephone, to convert text messages to facsimile format, or to perform character recognition on a facsimile message to convert it to text. These capabilities, for example might enable a user to select to have E-mail and voice mail messages both delivered as speech information over a telephone line. Alternatively, a subscriber might use the telephone to direct the facsimile message or a facsimile representation of an E-mail message to a fax machine in his office. The subscriber also could use a computer as a control device to direct those messages, and also she could use the computer as a delivery device. In other words, the subscriber could select to read her E-mail on her computer, hear voice mail through the computer or see faxes on the computer. Alternately, the subscriber could, for instance, select to direct faxes to a laser printer, forward voice mail with text annotation to another destination or send E-mail to a terminal device for resolution.

In accord with the present invention, another option of the unified message platform 315 is to send text based messages to the subscribers portable terminal device 30, for synthesized speech reproduction. Any message that the platform receives as text or can convert to text can be sent as a text message to the conversion server 311. The text to speech instruction server 311 converts each text message to the appropriate speech instructions and packetizes and addresses the instructions for transmission through the CDPD network to the terminal 30. In this manner, the subscriber can receive synthesized speech reproductions of text (e.g. E-mail) and facsimile messages at his terminal 30 through control of the unified platform 315. Using the two-way capability of the terminal 30, the subscriber also can respond to the mail messages, for example to instruct the unified platform 315 to redirect a mail message to other parties or to respond to the message originator using a finite set of predefined responses.

As in the earlier embodiment, the system of FIG. 5 preferably delivers messages to the portable terminals 30 using a 'push' type delivery process. The news is accumulated for the subscriber and sent as an E-mail message to a mail server 313 or 315. The appropriate mail server relays the news messages and/or other text messages to the text to speech instruction server 311. That server in turn relays the speech synthesizer instructions for the converted messages, in appropriate format, to the Mobile Data Intermediate System (MD-IS) 25. If the terminal currently is registered as active on the CDPD network, the MD-IS 25 knows which base station 27 is serving the receiving terminal 30, that the receiving terminal 30 is turned on and how to communicate with it via the air link. The MD-IS 25 pushes the packetized information out through the air link to the personal message terminal 30, where it is stored so that the user can choose to play it immediately or play it later.

As in the earlier embodiment, the CDPD modem in the terminal and the CDPD wireless network permit two-way communication. The terminal will have at least a limited keyboard and a display, for example to provide a soft key functionality, and will send input data upstream through the CDPD network 23 to the appropriate server(s).

For example, after listening to a message, a menu on the display may offer the user several options, such as requesting more messages regarding similar topics, changing the subscriber's profile, etc. In response to a user input, the software in the terminal 30 causes the transmitter of the CDPD modem to send a corresponding coded message through the CDPD network 23 and back to the mail server, POP 313 or platform 315. The upstream message would identify the related downstream message and the selected option. The mail server 313 or 315 runs appropriate software to interpret the response message and forward it as necessary to the appropriate point on the data network (e.g. Internet) 21. For the news service, for example, the mail server 313 or 315 formulates an appropriate E-mail message and transmits that message through the Internet 21 to the server 317 operated by the customer's information provider for further action, for example, to update the user's profile.

The upstream message, for example, may indicate that the user wants the next message or wants to get more messages. The upstream message may indicate a request for a more detailed message regarding the topic of the last message reviewed. The information provider's server 317 receives this command code for more information, formulates another E-mail message containing the information and sends it back through the network(s) to the terminal as in the earlier example of operation of the system of FIG. 5.

The upstream message may relate to a change in the user's profile. In this case, the information provider's server 317 updates the appropriate profile record. The server 317 may send a confirmation message back to the terminal 30.

The embodiments discussed in detail are representative examples of the best modes for implementing the invention. Persons skilled in the art, however, will recognize that the invention admits of a broad range of modifications.

For example, the two-way interactive communication system using the CDPD wireless data network is preferred. However, other wireless communication techniques may carry the news items or other messages to the terminal devices. For example, a headend may broadcast a stream of news items over an RF channel. Each item would include a header identifying the type or subject matter of the information in the associated message. The terminal would review the headers of all broadcast messages. The terminal would capture only those messages corresponding to the subscriber's profile. For this purpose, the terminal could store the profile and compare profile selection information to the message identifying data in the headers. Alternatively, each message would include an identifier, and the terminal could receive an addressed message from the headend instructing it which news item messages to capture from the broadcast channel. The profile could be created on-line and "pushed" into the terminal.

The above discussed implementation of the terminal device includes a memory for storing the MIDI bytes of the news messages. That implementation of the terminal processes the MIDI information to produce an audio output signal, during actual playback. One alternative is to convert each message to an audio signal as it is received or shortly after reception. The terminal would supply the audio signal to an audio recorder, such as a cassette or micro-cassette type tape recorder or a solid-state tapeless recorder. After transfer to the recorder, the terminal could reuse the memory for the next new message. The subscriber plays messages back from the audio tape by appropriate operation of the recorder or some other tape unit. The tape could store larger numbers of messages, and the amount of memory in the terminal is lower. This is particularly significant in the portable terminal.

For convenience of discussion, the various messages sent through the system to the subscribers terminal devices often have been referred to as news items or newscast messages, in the discussion above. It is understood, however, that the actual information in each of the messages may be any type of information that the network server and the terminal together can convert from text to speech. Typical examples include news-wire service reports, stock ticker reports and the like, but the inventive system can transport other information such as E-mail or text data obtained from the Internet to the terminals for presentation as speech to the subscribers. In an on-line chat session type context, for example, the subscriber would send text upstream through the network and thus to the other parties, whereas the terminal would provide a spoken output to the subscriber (who may be blind). Reception of text from selected Usenet news groups is also contemplated.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A system comprising:
a server coupled to a data communication network, said server being programmed to execute sequences of program instructions for:
 (a) obtaining textual information for forming messages for a plurality of subscribers,
 (b) performing a significant portion of a text to speech process to convert the textual information of at least one of the messages to speech synthesizer instructions, and
 (c) transmitting the speech synthesizer instructions over the data communication network; and
a subscriber terminal for receiving the speech synthesizer instructions via the data communication network, said subscriber terminal comprising a speech synthesizer and a vocabulary of speech sounds for synthesizing a speech waveform signal representing the at least one message from the speech synthesizer instructions.

2. A system as in claim 1, wherein the server includes means for transmitting the speech synthesizer instructions over a packet switched data network.

3. A system as in claim 1, wherein the terminal further comprises a programmable central processing unit and an interface coupled to the programmable central processing unit for communication via the data network.

4. A system as in claim 3, wherein the interface comprises a modem.

5. A system as in claim 4, wherein the modem comprises a wireless network data modem.

6. A system as in claim 5, wherein the wireless network data modem comprises a cellular digital packet data (CDPD) modem.

7. A system as in claim 1, further comprising a mail system for receiving mail messages for subscribers and supplying the mail messages as the textual information to the server for conversion and transmission to the subscriber terminal.

8. A system as in claim 7, further comprising a news information server, said server being programmed to execute sequences of program instructions for:
 storing profile information regarding news topics of interest to individual subscribers;
 receiving and storing news items from one or more sources;
 comparing the stored news items to the stored profile information to identify news items of interest to each individual subscriber;
 addressing mail messages containing text information representing the items of interest to subscribers mail boxes in the mail system; and
 transmitting the mail messages containing text information representing the items of interest to the mail system.

9. A system as in claim 1, further comprising a unified message management platform for receiving mail messages for subscribers in a plurality of different formats including text format, and at least one other format, converting mail messages from the at least one other format to the text format, and supplying the text format mail messages to the server as the textual information for conversion and transmission to the subscriber terminal.

10. A system as in claim 1, wherein the server also is programmed to execute sequences of program instructions for:
 storing profile information regarding news topics of interest to individual subscribers;
 receiving and storing news items from one or more sources; and
 comparing the stored news items to the stored profile information to identify news items of interest to each individual subscriber,
 wherein said textual information of at least one of the messages comprises one of the identified news items.

11. A system as in claim 1, wherein the speech synthesizer comprises:
 a memory storing a plurality of fundamental sound samples, in digitized form; and
 a concatenative speech synthesizer responsive to the instructions, for processing samples from the memory in an order specified by the instructions and to control parameters of each of the processed samples in a manner specified in the instructions, to thereby generate the speech waveform signal.

12. A network server, comprising:
 a computer coupled to a data communication network, said computer being programmed to execute sequences of program instructions for:
 (a) obtaining textual information for messages for a plurality of subscribers;
 (b) performing a significant portion of a text to speech process to convert the textual information of the messages to speech synthesizer instructions each speech synthesizer instruction identifying a fundamental sound and at least one control parameter for controlling generation of a waveform corresponding to the fundamental sound in a vocabulary of fundamental sounds stored in a subscriber terminal; and
 (c) transmitting sequences of the speech synthesizer instructions, representing the messages, over the data communication network to subscriber terminals for waveform generation in response thereto.

13. A network server as in claim 12, wherein the server also is programmed to execute sequences of program instructions for:
 storing profile information regarding news topics of interest to individual subscribers; and
 receiving and storing news items from one or more sources;
 comparing the stored news items to the stored profile information to identify news items of interest to each individual subscriber,
 wherein said textual information of at least one of the messages comprises one of the identified news items.

14. A communication terminal device, comprising:
 a data interface for receiving data from a communication network;
 a programmable central processing unit for processing the received data to capture speech synthesizer instructions contained in the received data;
 a memory storing a vocabulary comprising a plurality of fundamental sound samples, in digitized form; and
 a concatenative speech synthesizer responsive to the instructions, for processing samples from the memory in an order specified by the instructions and to control parameters of a waveform signal synthesized from the processed samples in a manner specified in the instructions.

15. A terminal as in claim 14, wherein the interface comprises a modem.

16. A terminal as in claim 15, wherein the modem comprises a wireless network data modem.

17. A terminal as in claim 16, wherein the wireless network data modem comprises a cellular digital packet data (CDPD) modem.

18. A terminal as in claim 14, further comprising:
a keyboard for supplying user inputs to the programmable central processing unit; and
a display for displaying information provided by the programmable central processing unit.

19. A method of providing personalized information services, comprising:
storing subscriber profiles relating to topics of interest to a plurality of individual subscribers;
receiving items of information from a plurality of sources;
comparing the items of information to the subscriber profiles to identify items of interest to particular subscribers;
converting textual information relating to at least some of the identified items of interest to sequences of speech synthesizer instructions;
transmitting each of the sequences of instructions to one or more terminals, each terminal being utilized by a subscriber;
storing received sequences of instructions in respective subscriber terminals;
in response to one of the sequences of instructions, retrieving sound samples from a memory comprising a vocabulary in a subscriber terminal in an order specified by the one sequence of instructions and adjusting process parameters for the retrieved samples in a manner specified by the one sequence of instructions, to thereby generate a speech waveform signal representative of one of the identified items of interest.

20. A method as in claim 19, wherein the step of converting textual information relating to at least some of the identified items of interest to sequences of speech synthesizer instructions comprises:
computing linguistic parameter specifications from input text data;
converting the linguistic parameters into synthesizer control parameters, said synthesizer control parameters identifying the samples in an order corresponding to the input text data and specifying the manner of adjusting the process parameters for the identified samples.

21. A method as in claim 19, wherein the step of transmitting comprises transmitting at least some of the sequences of instructions over a wireless data link to a plurality of the respective subscriber terminals.

22. A method as in claim 19, wherein the step of transmitting comprises transmitting at least some of the sequences of instructions via a packet switched data network.

23. A method as in claim 22, wherein the public switched packet data network comprises the Internet.

24. A method as in claim 19, wherein at least one of the respective subscriber terminals comprises a portable device with wireless data communication capability enabling wireless reception of sequences of the instructions.

25. A method as in claim 19, wherein at least one of the respective subscriber terminals comprises a personal computer for coupling to a public data network enabling reception of sequences of the instructions via the public data network.

26. A communication terminal as recited in claim 14, wherein said speech synthesizer instructions are in the form of MIDI (Musical Instrument Digital Interface) commands.

27. A system comprising:
a server coupled to a data communication network, said server being programmed to execute sequences of program instructions for:
(a) obtaining textual information for forming messages for a plurality of subscribers,
(b) performing a significant portion of a text to speech process to convert the textual information of at least one of the messages to speech synthesizer instructions in the form of MIDI (Musical Instrument Digital Interface) commands, and
(c) transmitting the speech synthesizer instructions over the data communication network; and
a subscriber terminal for receiving the speech synthesizer instructions via the data communication network, said subscriber terminal comprising a speech synthesizer and a vocabulary of speech sounds for synthesizing a speech waveform signal representing the at least one message from the speech synthesizer instructions.

* * * * *